INVENTOR.
MILAN MOMCHILOVICH
BY
ATTORNEY

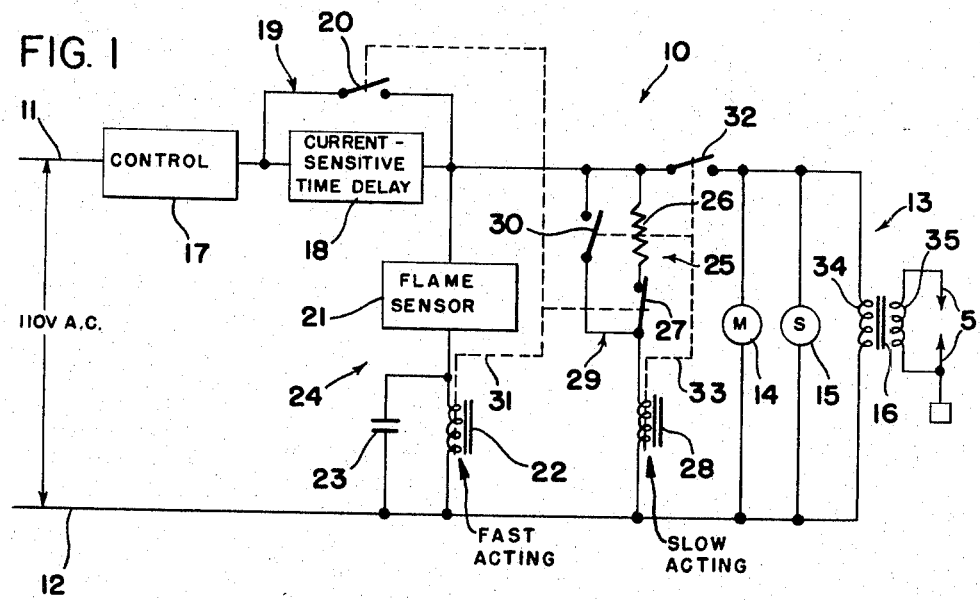
FIG. 1
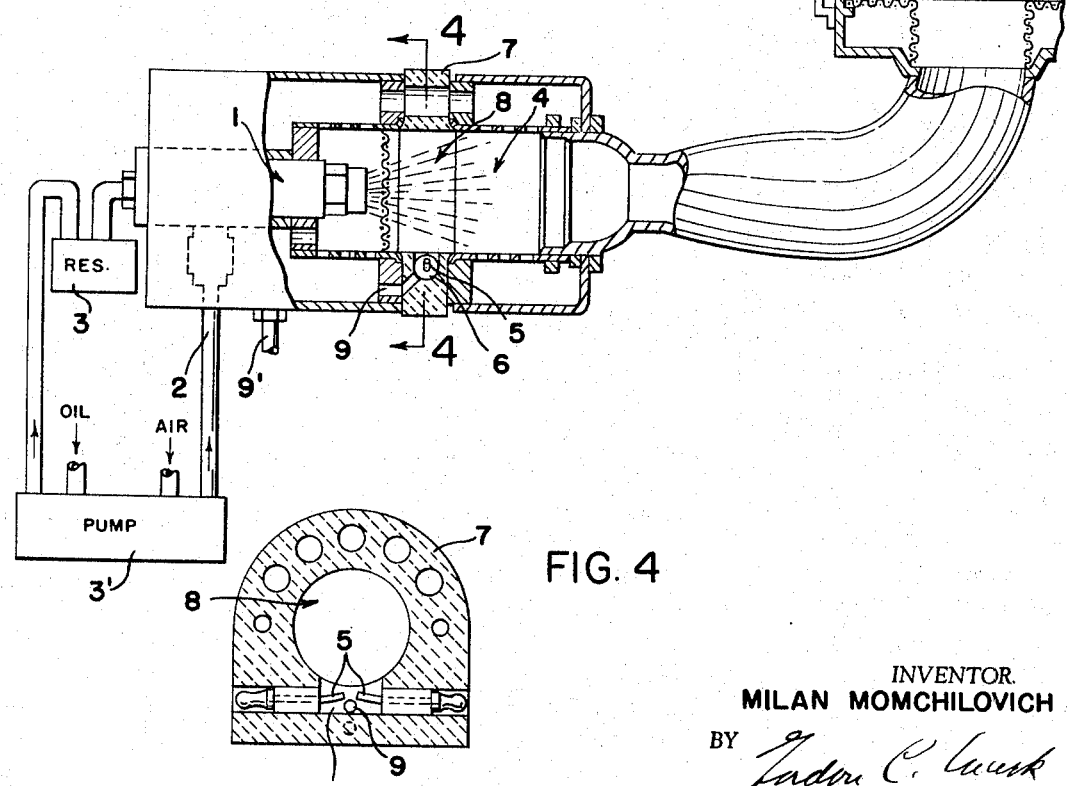
FIG. 3
FIG. 4
INVENTOR.
MILAN MOMCHILOVICH
ATTORNEY

United States Patent Office 3,320,998
Patented May 23, 1967

3,320,998
ELECTRIC CONTROL OF FUEL-BURNING
DEVICES
Milan Momchilovich, Akron, Ohio, assignor to The Falls Stamping and Welding Company, Cuyahoga Falls, Ohio, a corporation of Ohio
Continuation of application Ser. No. 287,911, June 14, 1963. This application Apr. 25, 1966, Ser. No. 545,163
10 Claims. (Cl. 158—28)

This application is a continuation of application Serial No. 287,911, filed June 14, 1963.

This invention relates to a control circuit, particularly adapted to control heat systems, and which is more specifically directed to a versatile control circuit adapted to regulate one or more fuel-burning devices such as furnaces, or appliances such as hot water heaters, incinerators and the like.

The invention is designed for the control of burners utilizing open flames, and more particularly oil or gas burners. It may also be used in the control of burners utilizing powdered fuels. If the fuel is conveyed to the burner by a gas or vapor such as air or steam, as described more particularly herein in connection with the drawings, the invention may be used for the control of the supply of that gas or vapor to the burner, and thus provides control of the fuel to the burner. The supply of the fuel, or both such gas or vapor and the fuel can be controlled.

Fuel-feeding means as used herein is intended to mean any method and mode of controlling supply of the combustible mixture, such as gravity, pump, natural pressure which may be controlled by a solenoid-operated valve and/or the control of the power to a motor-driven pump or pumps pressurizing the fuel.

In its broadest sense, the invention contemplates the provision of a novel circuit adapted to use conventional line voltages, thereby requiring a minimum number of components. The circuit, as constructed, is separated into two major functional categories, sensing and control. First and second control means are positioned across the line with the first control means capable of disabling the second. The second control means controls the main line switch, thereby controlling fuel supply and ignition. The first control means may be considered broadly as being a part of the sensing network. If safe conditions exist in the appliance, the second control means may be energized to thereby energize the main line to supply fuel and/or air or the like to the burner. If the burner temperature is at a level whereby ignition, other than under controlled circumstances, could occur, the first control means disables the second, thereby preventing fuel and/or air or the like from being supplied to the burner cavity. Additional means is provided to complete the circuit and provide the necessary safety devices for contingencies other than a hot burner cavity. Exemplary of such contingencies is ignition failure, inoperativeness of one of the component parts and satisfaction of the demand for heat.

The invention further contemplates use of a single means to supply fuel and/or air or the like to a plurality of devices with appropriate means provided in each device circuit to stop and start the flow of fuel and/or air or the like to the respective units. Continuous ignition is provided with each device and controlled so as to be operative at all times when fuel is being supplied. Safeguards similar to those enumerated above are provided.

In the main, the prior-art devices have relied upon two distinct systems to control fuel-burning devices. One portion of the system utilizes line voltage for fuel supply and ignition while the second portion required uses voltages of a lower order, such as 24 volts, to control the line circuit switches. This has resulted in the system being quite expensive as opposed to the instant circuit, which utilizes line voltage and a reduced number of components to perform both functions without sacrificing safety. Moreover, the complexity of the prior-art systems has given rise to greater probability of failures due to the necessity of more required component parts, as well as an undesirable increase in the power dissipated by the circuit. Additionally, it has been difficult to find a system which will utilize line voltages while providing the essential safety factors, keeping in mind structural simplicity. In smaller devices the physical size of the control unit presents a problem; therefore, it is highly desirable to make a safe, yet compact, control unit which may be readily incorporated in the small appliance.

It is, therefore, an object of this invention to provide a novel control circuit to control heat systems.

It is a further object of this invention to provide a control circuit which will use line voltage and line current in the controlling function.

It is a further object of this invention to provide a control circuit which is structurally simple, however, capable of providing the necessary safeguards for safe and efficient operation.

It is a further object of this invention to provide a control circuit which is versatile, allowing it to be used with a wide variety of devices.

It is a further object of this invention to provide a basic control circuit which will utilize common component parts for a plurality of devices.

Further and fuller objects of this invention will become readily apparent when reference is made to the drawing and the specification, in which:

FIGURE 1 is a schematic representation of the novel circuit in the cold or deenergized position;

FIGURE 3 is a fragmentary cross-sectional view of a burner cavity;

FIGURE 4 is a view taken along lines 4—4 of FIGURE 3;

Figure 2:
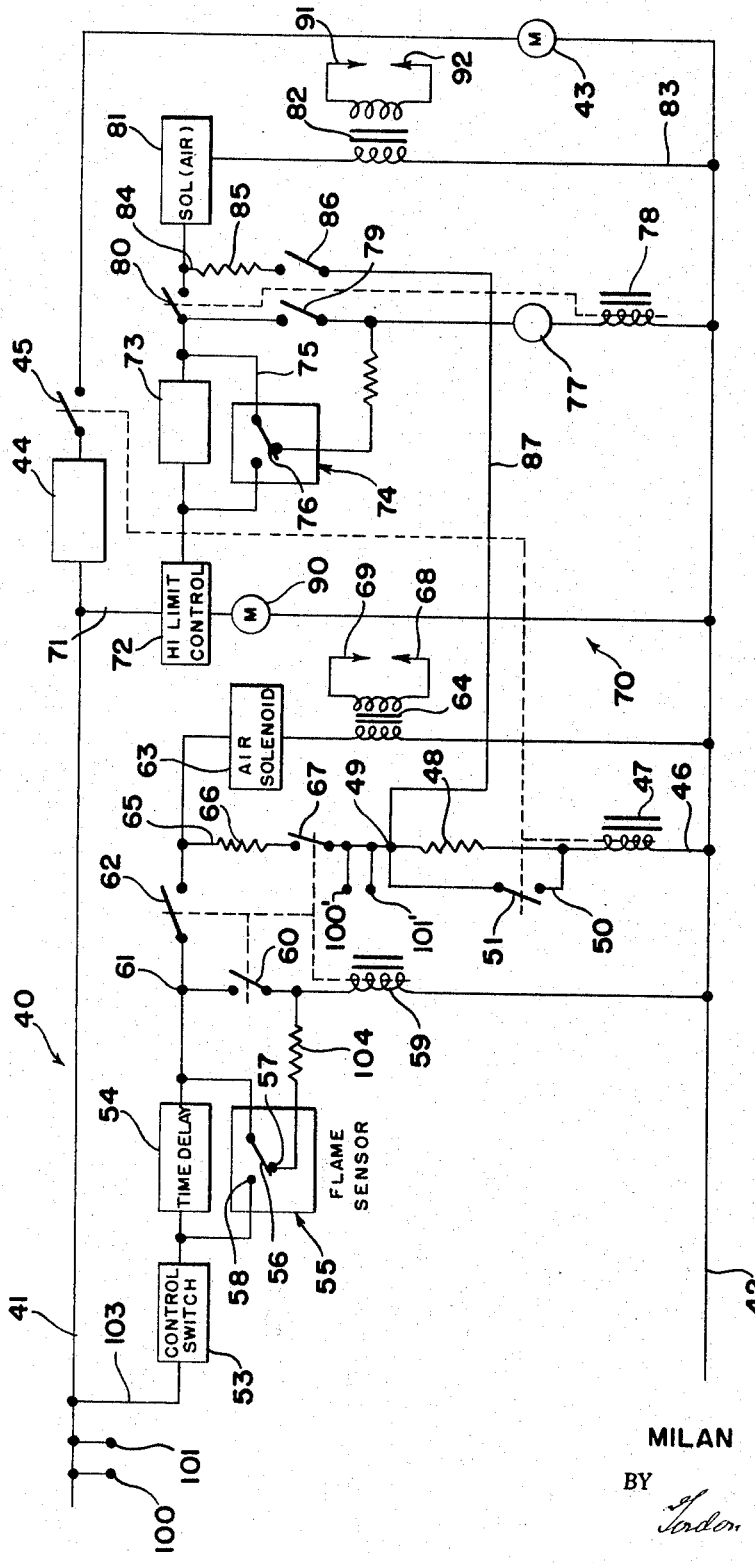
FIGURE 2 is a schematic representation of a modified form of circuit wherein a plurality of devices are controlled by a single fuel-supplying device.

One form of burner utilizing the instant circuits is shown in FIGURES 3 and 4. In the nozzle 1, air from line 2 lifts oil from the reservoir 3, and supplies a combustible mixture of the oil and air to a burner cavity 4 across electrodes 5. The oil and air may be supplied in various manners to the reservoir 3 and air line 2, respectively. For example, a gravity-fed reservoir could be aspirated by a conventional air pump; or the fuel to the reservoir, as well as the air, could be supplied by several pumps, or a single pump, such as that indicated schemtically at 3', the latter being fully described in detail in the co-pending application Ser. No. 236,481, filed Nov. 9, 1962, assigned to the assignee of the instant case and now abandoned. The oil reservoir 3 is supplied from a pump in the circuits to be described, and is provided with a constant-level device and overflow pipe so that the oil is maintained at a constant level in the reservoir. Air from pipe 1 aspirates oil in the burner, and this lifts the oil from the reservoir 3 as required. The reservoir 3 is located about an inch below the axis of the burner. The oil does not flow by gravity to the burner, so the oil supply is stopped by shutting off the air supply, as herein described. This burner and oil supply arrangement are more fully described in the above-mentioned co-pending application.

The fuel is ignited in the cavity 4 by the spark across the electrodes 5. As is best seen in FIGURE 4, the electrodes are positioned in a recess 6 in the dielectric ring 7 away from the central opening 8 of the burner cavity to prevent accumulation of carbon thereon. A current of air flowing through inlet 9 which enters the burner system through pipe 9' serves to cool the electrodes while blowing the spark into the fuel path. Air is supplied to both pipes 2 and 9' by the pump in the systems to be described, and this pump may also supply oil to the reservoir although the oil and the secondary air entering through pipe 9' may be supplied in any suitable manner. By controlling the air which lifts the oil into the burner, the circuit to be described controls the burner operation.

Referring now to FIGURE 1, the circuit 10 embodies first and second lines 11 and 12 adapted to be connected to a load indicated generally at 13. The load in the present instance may comprise a motor 14, a solenoid 15 and transformer 16 connected in parallel across the line.

The term "load" as used herein is intended to include any one or a combination of motor-driven pumps, solenoid-operated valves, electrical ignition means, or analogous structures which may be used in supplying, controlling and igniting a combustible mixture in a burner cavity.

The lines 11 and 12 at their opposite end are adapted to be connected to any conventional 110-volt source which would be normally found in the factory, the home, or the like. It is to be understood that the circuit may be used with other voltages with only minor changes in component parts necessary.

In one side of the line 11, between the load and the source, there is a control 17, which is usually a mercury or snap-action switch. This may be of the conventional type which may be selectively set to open and close at the desired temperature level. It may be any of the temperature responsive or control devices known as thermostats, timer switches, and the like, depending upon the particular use of the circuit.

The output side of the temperature control is connected to a current-sensitive time delay (thermal or magnetic, etc.) 18.

External factors act upon control 17 to go ON and OFF. These factors may be changes in temperature or physical positioning of a mechanical timer or other ON-OFF control mechanism. The system would normally respond to each of these factors in response to the forces imposed. However, the current-sensitive time-delay 18 permits the load current to pass for some period of time in which the flame sensor is activated, and if it is not activated the time delay 18 interrupts the current to the control and load located beyond it.

The current-sensitive time-delay 18 acts as a safeguard to deenergize the circuit in the event of malfunctions, such as failure of ignition, short-circuited load and the like. It is obvious that abnormal levels of current through this time-delay 18 will cause the circuit to be opened almost instantly. Manual resetting means is included.

A shunt circuit 19 shunts the time-delay 18 and is provided with normally open switch 20 therein. The output side of the time-delay 18 and the shunt circuit 19 are connected to a first control means 24 provided across the lines 11 and 12. The first control means includes a flame-sensor 21 in series with a relay 22. A capacitor 23 is provided in parallel with the relay 22 to establish suitable filtering thereacross and thereby smooth out the pulsating D.C. relay current.

It is obvious that the first control means could be placed across lines 11 and 12 immediately ahead of the control or time-delay with suitable means such as a fuse in the circuit for protecting against short circuit. The circuit, as illustrated, utilizes the single current-sensitive time-delay for insuring safety throughout the operation of the electrical system.

A second control means indicated generally at 25 is in parallel across a line with the first control means 21, 22. The second control means includes a resistor 26, normally closed switch 27 and second relay 28, all in series across the lines 11 and 12. A suitable holding circuit 29 is provided to bypass the resistor 26 and switch 27. The holding circuit includes normally open switch 30, which when closed would shunt resistor 26 and switch 27, placing only the relay 28 across the line.

The relay 22 in the flame-sensor circuit is connected, as indicated in dotted lines 31, to the switch 27 in the resistor relay circuit, as well as the time-delay shunt circuit 19. The second relay 28 is operably connected (dotted lines 33) to the normally open switch 30 in the holding circuit as well as main line switch 32 in the line 11. The switch 32 serves to control the power to the load 13.

The condition of a continuous circuit through the flame-sensor 21 at the time the control device 17 turns ON constitutes an unsafe condition. The presence of resistor 26 in series with the second or load relay 28, permits the flame-sensor relay 22 to operate well in advance of load relay 28 when flame-sensor 21 is a current conducting state. This action opens the series normally-closed relay contact 27 and the heating cycle is never initiated. The heat cycle cannot be initiated until the flame-sensor 21 indicates that it is in its proper sensing mode.

The motor 14 may comprise a shaded pole motor with a 7-ampere locked rotor rating, although other types of motors with rotor ratings of higher or lower value may be used with suitable adjustments of the values of the time delay 18.

The transformer 16 has a primary winding 34 in parallel with the motor 14 and solenoid 15. The secondary winding 35 of the transformer is connected to a pair of electrodes 5, shown schemtically. The electrodes 5 are adjustable to vary the gap, as is more clearly apparent in the description of FIGURES 3 and 4. The transformer 16 is of a conventional design, stepping the 110 volts up to several thousand volts, to provide a continuous sparking across the electrodes 5 when the circuit is energized.

In operation, on a call for heat, the control 17 upon going below the preset temperature closes, thereby completing the circuit to the cut-off device 18, resulting in current flow through the time-delay cut-off device 18, through the resistor 26 and relay contact 27 to relay 28. Upon energizing relay 28, main line switch 32 is closed, as well as switch 30 to complete the holding circuit 29. The load is then energized, or in the instant case, motor 14 begins to run, pumping fuel to the reservoir 3 and air to the burner 1. Solenoid 15 is energized to open a valve (not shown) allowing fuel flow to the burner. The transformer 16 is energized simultaneously with the motor and solenoid, thereby causing spark discharge across the electrodes 5 to ignite the fuel. At this point, the flame-sensor, being a heat and/or light responsive switch, such as a bimetallic element, cadmium sulfide cell, or photoelectric cell, closes, completing the circuit to relay 22. The energization of relay 22 closes the switch 20 completing shunt circuit 19 to shunt the time-delay cut-off device 18, as well as opening normally-closed switch 27 in the second relay 28 circuit.

The opening of normally-closed switch 27 is without effect, since relay 28 provides its own holding circuit by closing switch 30, thereby shunting switch 27 and resistor 26. Accordingly, the second relay 28 remains energized holding main-line switch 32 closed.

Upon preset or satisfied condition being reached, the control 17 opens line 11, and the circuit is deenergized returning the relays to the deenergized state and the associated switches to the position shown. However, the heat or flame-sensor 21 remains closed until the burner chamber cools below a safe level. Assuming an immediate demand for heat is made, the sequence would follow as above with respect to the control 17 and the time-delay 18. The sensor 21 would remain closed, since the heat in the burner chamber would probably be at a level hot enough to ignite a mixture other than under controlled conditions. During the period that time-delay cut-off 18 is closed, relay 22 would immediately be actuated closing the shunt circuit 19, while opening normally-closed switch 27 in the second relay circuit. Resistor 26 in series with the second relay 28 serves to cause a slight delay in operation of the second relay 28, thereby enabling the first relay 22 to be energized before the second relay 28. Accordingly, the second relay 28 cannot subsequently be energized since actuation of relay 26 has opened switch 27. When the flame-sensor cools, indicating a safe heat level in the burner, it would open the first relay circuit 24, deenergizing the relay 22, thereby opening switch 20 and closing switch 27 in the second relay circuit 25. The normal sequence of steps for a cold burner would follow. This illustrates that unless conditions in the burner are safe, restarting cannot be achieved.

The novel circuit explained above provides safety features for unsafe contingencies which may be encountered in the operation of a burner. For example, if the flame were extinguished during normal operation, the flame-sensor 21 would cool, opening switch 20 in shunt circuit 19 and after a predetermined interval, the time-delay cut-off device 18 would open to deenergize the circuit. If a power failure were to occur during a normal operation, the burner flame would be extinguished due to failure of ignition and fuel supply. Upon the resumption of power, the normal sequence set forth above would occur, assuming the burner chamber had cooled to a safe level. If a failure of ignition occurred due to transformer or electrode failure, the lockout switch would trip in the same manner as if failure of flame had occurred. The time-delay switch 18 would normally require manual resetting before operations can resume, thereby alerting the operator that the system is not operating properly, so that proper corrective measures may be taken.

Figure 5:
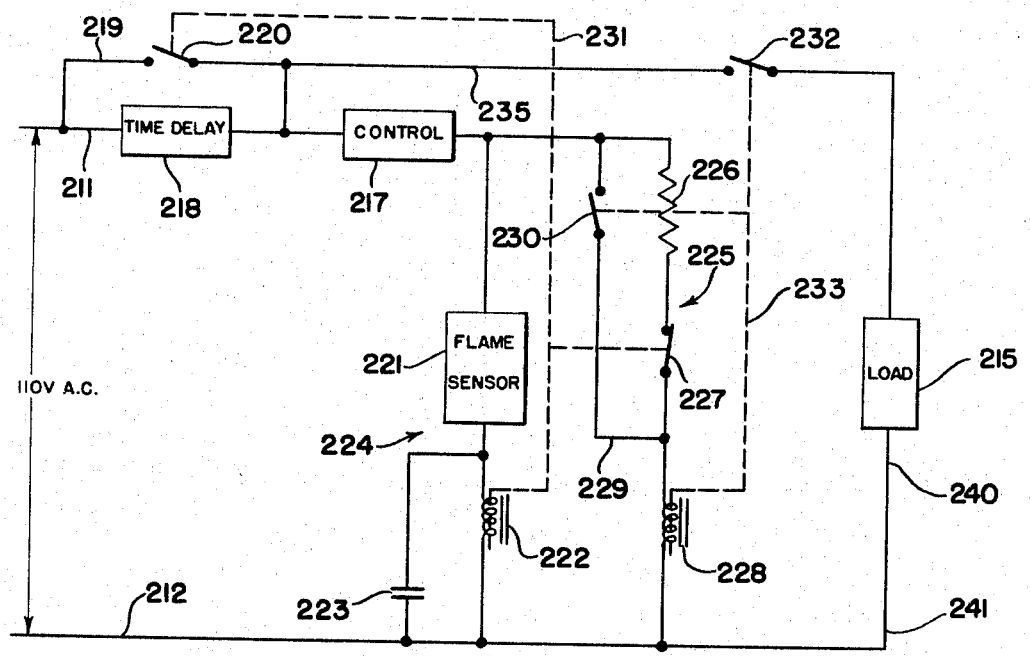
FIGURE 5 is a modified form of circuit similar to FIGURES 1 and 2, however, placing the control out of the path of full load current.

A modified form of the circuit shown in FIGURE 1 is illustrated in FIGURE 5. (Insofar as practical, elements like those of FIGURE 1 are identified by the same numbers with the prefix 2.) This circuit includes a first control means 224 and second control means 225, which are identical in structure and operation to the analogous control means 24 and 25 of FIGURE 1. The first control means 224 includes a heat or flame-sensor 221 and a relay 222 in series therewith across the lines 211 and 212. A capacitor 223 may be used in parallel with the relay 222 to provide suitable filtering for the pulsating D.C. relay current. The second control means includes resistor 226, normally closed switch 227, and relay 228 in series across the lines. A holding circuit 229 shunting the resistor 226 and switch 227 is provided, having normally open switch 230 therein.

In the embodiment of FIGURE 5, the time-delay cut-off device 218 and thermostat 217 have been reversed in position from the embodiment of FIGURE 1. As was true in the FIGURE 1 embodiment, the first control means 224 may be positioned ahead of the time-delay or between the time-delay and control, with a suitable safety means against short circuit being provided. The time-delay cut-off device 218 has the shunt circuit 219 shunting it. Normally open switch 220 in the shunt circuit 219 is controlled by relay 222 through the connection indicated by dotted lines 231. A separate line 235 is led off the shunt circuit 219 containing load 215 which is connected on the opposite side to line 212. Main-line switch 232 in line 235 is normally open when the system is in the cold or deenergized condition. Main-line switch 232 is controlled by relay 228, as indicated by dotted lines 233. This relay could be positioned in line 212 if desired. Similarly, switch 230 is controlled by 228 as was switch 30 controlled by relay 28 in the FIGURE 1 embodiment.

One reason for reversing the time-delay and thermostat, and adding line 235 to the load 215 (which may include a motor, solenoid and transformer, as in FIGURE 1), is that such construction enables the full load current to bypass the control 217. Thus, the wiring for the control 217 need only be heavy enough to carry about 50 milliamperes.

The operation of the circuit of FIGURE 5 is similar to the embodiment of FIGURE 1, with the steps being as follows. Upon the call for heat, the control 217 closes completing the circuit through the second control means, energizing the relay 228, thereby closing switch 230 and 232 with the resultant energization of the load 215. At this time the power will flow through current-sensitive time-delay cut-off device 218 through line 235, switch 232, to the load. When flame or heat is proved, flame-sensor 221 completes the circuit through relay 222, opening normally closed switch 227 and closing shunt circuit 220, thus shunting the time-delay cut-off device 218. The operation continues until a satisfied condition is reached, at which time control 217 is opened, deenergizing relays 222 and 228 with the resultant deenergizing of the load. If flame is not proven within the set period (usually a few seconds) the current-sensitive time-delay cut-off device 218 opens deenergizing the system. The normal safeguards against restarting when a hot burner exists are included and operation is similar to FIGURE 1.

Figure 6:
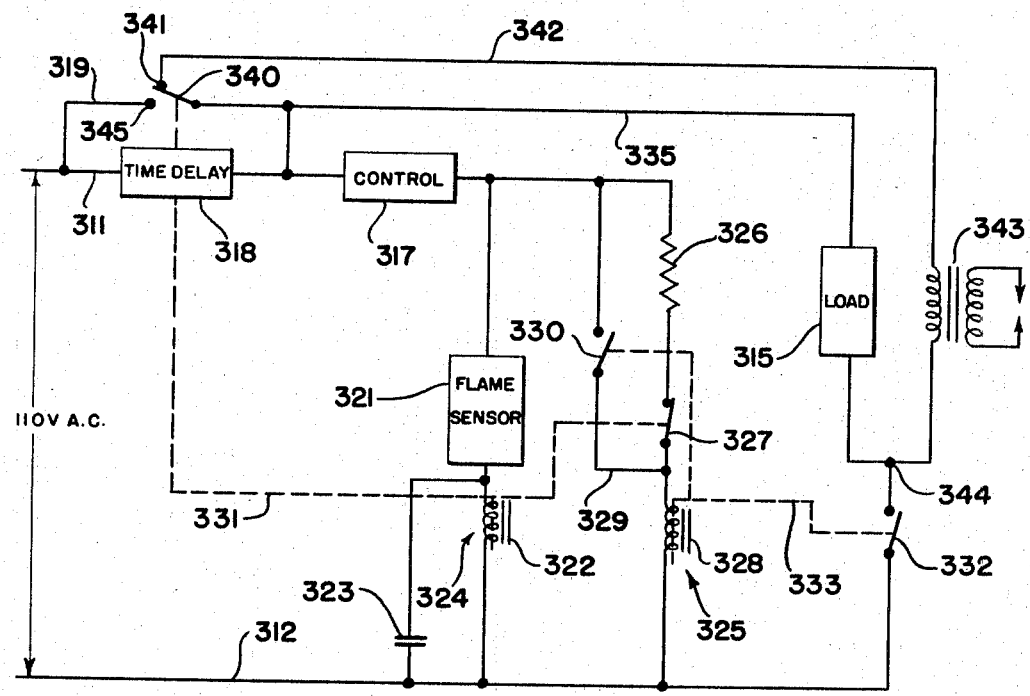
FIGURE 6 is a modified form of circuit similar to FIGURE 5 wired for intermittent ignition.

A circuit similar to the circuit of FIGURES 1 and 5 is illustrated in FIGURE 6; however, it is modified to provide intermittent ignition. (Insofar as practical, elements like those of FIGURES 1 and 5 are identified by the same number, except that they are prefixed with the number 3.) The circuit of FIGURE 6 includes main lines 311 and 312 adapted to be connected to a suitable voltage source, such as any 110-volt source commonly found in homes and factories. A delay cut-off device 318 is provided with a shunt circuit 319. A temperature-sensitive control 317 is in series with the time-delay cut-off device 318.

The first and second control means 324 and 325 are identical in structure and function to that of FIGURE 5. The circuit of FIGURE 6 differs from that of FIGURE 5 in that mainline switch 332 is placed between the load and line 312. A double pole single throw switch 340 is provided in shunt circuit 319, with one of the poles 341 having a line 342 leading to an ignition means 343 and connected to a common terminal 344 with the load 315. The first control means operates the normally open switch 340 to the closed position, as well as opening normally closed switch 327 in series with the relay 328. The relay 328 is serially connected to the line through resistor 326. A suitable holding circuit 329 shunting resistor 326 and switch 327 is provided having a normally open switch 330 controlled by relay 328 therein.

In operation, on a call for heat, assuming a cold burner, the control 317 closes and relay 328 actuates closing switch 330 and switch 332. Power flows through the delayed cut-off device 318, through switch 340, terminal 341, line 342 to the ignition, as well as through line 335 to the load 315. When flame is proven, flame-sensor 321 closes completing the circuit through relay 322, moving switch 340 against pole 345 breaking the circuit through line 342, while energizing the shunt circuit 319 to shunt the time-delay cut-off device 318. It is apparent that ignition will cease when flame is proven. The normal safeguards explained in connection with FIGURES 1 and 5 are provided, in that restarting cannot be achieved until the burner goes below the predetermined temperature necessary to open the flame-sensor 321. The various embodiments shown are illustrative of the modifications which could be made in the instant circuit without sacrificing safety which is of vital importance in the instant application.

It is to be appreciated that FIGURES 1, 5 and 6 are illustrative of circuits to control a single device. In the case of oil-burning systems, the load would include the motor 14 driving a compressor and/or pump with solenoid such as that indicated at 15 controlling fuel-line valves. In one concrete embodiment, relay 28 is valued so as to operate at approximately 100 volts in series with resistor 26. Voltages of lesser orders will fail to operate relay 28, and the system will remain inoperative, until adequate voltage is available.

The parts illustrated in the circuits are conventional parts available on the open market, and it is to be understood that any suitable substitute capable of performing the equivalent function would be satisfactory in practicing the invention.

A modified form of the foregoing circuits is shown in FIGURE 2 wherein a single motor driving a fuel supplying means or the like is used in conjunction with a plurality of devices. In the interest of a complete and clear description, only two devices are shown, however, it will become readily apparent that a number of appliances may be added to the circuit within the limitation of the capacity of the fuel supplying source.

The second circuit described in connection with FIGURE 2 includes a thermostat, and is designed for use with a device such as a furnace.

A control circuit for the complex comprising the flame sensor 55, the solenoid 63 and the transformer 64 to control a single appliance is indicated generally at 40 with the switches being in the at-rest or satisfied state. The circuit 40 includes a first main line 41 and a second main line 42, which are adapted to be connected to a suitable source of power. The second line 42 is connected directly to a motor indicated schematically at 43. The first line 41 is connected to the motor also; however, it has a current-sensitive time delay 44 and main line switch 45 between the motor and the power source, both of which are a part of a circuit common to said appliance control circuit 40 and a furnace control circuit 70 to be described. This common circuit includes also the motor 43 which operates a single fuel pump and air blower which supply the furnace and all appliances each of which latter is provided with its own separate control circuit such as the circuit 40. Switch 45 is actuated when relay 47 is closed, and this starts motor 43. This motor supplies the air to the burner (FIGURE 3) which aspirates the oil to the burner nozzle, lifting oil from the oil reservoir about one inch below the horizontal axis of the nozzle where the oil is maintained at a constant level.

If there is some malfunction in an appliance or in the furnace, the control circuit connected therewith will shut off the current to this appliance or the furnace. On the other hand, if the motor 43 malfunctions, and an excessive current is drawn, time delay cut-off element 44 opens the motor circuit. The opening of the individual circuit controls necessarily follows as the circuits are activated by demand for heat.

The circuit 40 includes line 46 connected to the second main line 42, and extends to a relay 47. The relay is connected to a resistor 48 which in turn is connected to a main or common junction point 49. A shunt or relay-holding circuit 50 is in parallel with the resistor having normally open switch 51 therein. The relay 47 upon being energized operates to close switch 51 and main-line switch 45, the connection between being illustrated by dotted lines. The above described portion of the circuit is common to all appliances. As it becomes necessary to control more than one appliance utilizing a single motor or solenoid valve for the fuel supplying function, appliance circuits of varied form may be added.

The circuit 40 also comprises a line 103 connected to the main-line 41 leading to a switching device similar to that described for 17 in FIGURE 1, indicated diagrammatically at 53. The opposite side or output side of the temperature control device 53 is connected to a time-delay cut-off device 54. A flame sensor 55 is connected in parallel with the delay cut-off device 54 and includes a single pole double throw switch 56. The circuit is illustrated in the cold or satisfied condition with the switch connected to terminal 57; however, upon flame being detected the switch moves to terminal 58, as will become hereinafter apparent. As shown, the switch 56 completes the circuit through a resistor 104 to relay 59 which is connected to main-line 42. Normally open switch 60 is in series with the relay 59 and is connected to the output side of the time-delay cut-off device 54 at terminal 61. A line extends from the terminal 61 through switch 62, solenoid 63 and primary of the transformer 64 to complete the circuit to line 42. Intermediate the solenoid 63 and switch 62 is a branch line 65 which includes a resistor 66 in series with normally open switch 67, the latter being connected to the main or common terminal 49. Each of the switches 60, 62 and 67 will be actuated to the closed position upon the energization of relay 59, the interconnection being illustrated by the conventional dotted lines.

In operation, it can be seen that when a unsatisfied condition exists, the control device 53 will close completing the circuit to the time delay cut-off device 54, the circuit will then be closed through the delayed cut-off device, and power will flow through the line 65, switch 56, and terminal 57 to line 42 thereby energizing relay 59. Upon the energization of relay 59, switch 60 closes, thereby providing a holding circuit for the relay 59. Switch 62 also closes thereby completing the circuit to the solenoid 63 and transformer 64 for purposes to become apparent. After a brief delay, switch 67 having been closed with the actuation of relay 59, power is supplied through switch 67 and terminal 49 through resistor 48 to energize relay 47 which is connected to main line 42. Relay 47 closes switch 51 shunting resistor 48 and simultaneously closes main line switch 45 to energize the motor 43 after the main-line time-delay 44 completes the circuit.

Fuel and air will be supplied by the motor across the electrodes 68 and 69 (similar to electrodes 5 of FIGURE 1), thereby igniting the mixture. Power is supplied to the electrodes from the secondary of the transformer 64. Control of the air which aspirates the fuel will be effected by the solenoid 63 which is connected to a main valve (not shown) in the air line (not shown). Upon a hot condition being reached, switch 56 is thermally activated, moving to the terminal 58 thereby shunting the time-delay cut-off device 54. It can be appreciated that if ignition fails, the time-delay cut-off device 54 will cut off within a matter of a few seconds, thereby deenergizing the entire circuit, since the shunt circuit around the time-delay cut-off device will not be completed until a flame exsts to close switch 56.

As pointed out hereinabove, several appliances and a furnace may utilize the main control system indicated generally at 40. The furnace control circuit is indicated generally at 70 having a main line 71 hooked to the main line 41 ahead of the motor timer 44. The main line 71 passes through a high limit control 72 for purposes to be described hereinafter. The high limit control 72 is a commercial device and not a part of the control circuit.

In series with the high limit control 72 is a time-delay cut-off device 73 having a flame-sensor 74 in parallel therewith. The time-delay cut-off device 73 and flame-sensor 74 are analogous in function to the time-delay cut-off device 54 and flame-sensor 55 in the appliance circuit 40, and function in a similar manner. As was true in the appliance circuit 40, power is supplied through line 75, and the switch of the flame-sensor 76 to a high-voltage temperature-regulated switch or thermostat indicated schematically at 77. (A transformer may be substituted at 77 in order to operate with a low-voltage thermostat.) A relay 78 is connected to the thermostat 77 on one side and to the main line 42 on the other to complete the circuit. A suitable holding circuit 79 is provided for relay 78 to bypass the flame-sensor 74 when the relay 78 is energized. An additional switch 80 is provided in series with the delayed cut-off device 73, and controls the power to solenoid 81 and transformer 82, the latter being connected by line 83 to main line 42 to complete the circuit. Intermediate the switch 80 and solenoid 81 is a branch line 84 having a resistance 85, and normally open switch 86. The switch 86 is connected by line 87 back to the common or main terminal 49. Switches 79, 80 and 86 are controlled by relay 78 so that they will be moved to the closed position upon energization of relay 78. Across the lines 71 and 42 is provided a fan motor 90 being connected to line 71 through the temperature-control device 72.

For convenience of description the circuit 70 is referred to as a furnace circuit; however, it is to be understood that it may control any analogous device. In operation, on a call for heat, thermostat 77 closes, energizing time-delay cut-off device 73. Power flows to line 75 through flame-sensor 74 and closed switch 76, thereby energizing relay 78 which closes switches 79, 80 and 86. Closing of switch 80 results in the energization of the solenoid 81, and the primary of the transformer 82 to begin continuous sparking across the electrodes 91 and 92. Solenoid 81 controls air supply. Closing the switch 86 energizes relay 47 by supplying power through line 87. Relay 47 being energized serves to complete its holding circuit 51 while closing main-line switch 45, starting the motor 43. The motor 43 supplies fuel through the solenoid-controlled valve (not shown) across the electrodes 91 and 92, the latter igniting the mixture to supply heat. After a predetermined heat level is reached, the fan motor 90 is energized to carry the heat away from a heat exchanger normally found in forced air systems. Obviously, in gravity systems this may be omitted. Upon reaching a predetermined or satisfied heat level, the temperature responsive device 72 opens to deenergize the solenoid 81 and transformer 82, thereby deenergizing the circuit 70. The control 72 is of a type such that it will complete the circuit through the fan motor 90 above predetermined temperatures at the heat exchanger, say, for example, 250° F. The fan will continue to run until such time as the heat exchanger gets below a preset temperature. Then the fan motor 90 will be automatically turned off also by the control 72.

The circuits 40 and 70 will be seen to be identical except for the thermostat 77 and the substitution of a high-limit control 72 for control switch 53.

It can be appreciated that both the appliance and furnace circuits may be operated at the same time, or one circuit may be energized without the other since each is operatively connected to the main relay 47 which controls the main-line switch 45 and motor 43. Additional furnaces or appliances or both may be joined between the terminals indicated at 100 and 101, 100' and 101', each circuit being identical to the circuit 40 or 70. Thus, a plurality of appliances and furnaces may be run from a central source utilizing a single motor to drive a pump supplying fuel and air thereto.

It is not intended that the drawings or description of particular circuits be limiting, since it is understood the scope of the invention is defined by the spirit and scope of the appended claims.

I claim:

1. In a control circuit for controlling a fuel-burning device, first and second lines adapted to be connected to a voltage source, a load across said lines, an adjustable control means responsive to changes in heat conditions in one of said lines, a time-delay means connected in series with said control means, shunt circuit means around said time-delay means, said shunt circuit having a first switch therein which is normally open when said fuel-burning device is in the cold condition, flame sensor means having a first relay in series therewith across said first and second lines intermediate said load and said time-delay means, said first relay operating said first switch to the closed position when said first relay is energized, second relay means having a second switch means and resistor means in series therewith across said lines, said resistor rendering said second relay means slower acting than said first relay, said second switch means being operatively connected to said first relay so as to be opened upon energization thereof, shunt circuit means around said resistor means and said second switch means, said shunt circuit means having third switch means therein, said third switch means being operatively connected to said second relay means so as to be closed when said relay is energized, fourth switch means in one of said lines between said load and said second relay means, said fourth switch means being actuated to the closed position when said second relay is energized thereby placing a potential across said load.

2. The control circuit of claim 1 wherein said load across said lines includes a motor adapted to drive pump means to supply fuel and air to a burner.

3. A control circuit to automatically control the operation of a fuel-burning device comprising first and second lines adapted to be connected to a suitable source of power and further being connected to a load, first control means in circuit with said lines adapted to sense an unsatisfied heat condition and respond thereto by completing said circuit therethrough, current sensitive means in series with said control means being normally in a closed condition and assuming an open circuit condition after the passage of current therethrough for a predetermined period of time, second and third control means in parallel with said load across said lines, said second control means sensitive to flame conditions being established at said fuel burning device during the normally closed condition of said current sensitive means to close a suitable shunting circuit thereacross as well as control energization of said third control means including means to delay the operation of said third control means relative to said second control means, said third control means controlling a main switch means in one line to energize said load when said second control means senses improper flame conditions at said fuel-burning device, such that upon attaining the desired heat condition said first control means will interrupt the application of voltage through said first and second lines to thereby deenergize said second and third control means and said load.

4. The control circuit of claim 3 wherein said load includes a motor-driving pump means and a transformer primary across said lines, said transformer having a secondary connected to a pair of spaced electrodes whereby continuous sparking will occur when said motor is energized and supplying fuel and air to a burner.

5. The control circuit of claim 3 wherein said second control means includes a flame sensor and relay in series, with the input of the flame sensor connected to the output of said current sensitive means.

6. The control circuit of claim 3 wherein said load across said lines includes a motor adapted to drive pump means to supply fuel and air to a burner.

7. The control circuit of claim 3 wherein said third control means and said means to delay its operation comprise a resistor, normally closed switch means and relay across said lines, said resistor rendering said third control means slower acting than said second control means, and a holding circuit for said relay, said holding circuit shunting said resistor and switch means, said switch means being actuated to the open position on the energizing of said second control means.

8. A control system for controlling a fuel-feeding means, said fuel-feeding means being adapted to supply fuel to a pair of burners, which system includes first and second control means each of which is adapted to control the flow and ignition of the fuel to one of said burners, said fuel-feeding means being connected across first and second lines, one of said lines having a first relay connected thereto, said first relay operatively connected to a main-line switch in one of said lines and further being connected to a resistor to thereby render said first relay slower acting, a holding circuit shunting said resistor, said holding circuit having switch means therein operatively connected to said first relay, said resistor and holding circuit joining at a common junction, first and second circuit means connected to said common junction and further being connected to the other of said lines, each of said circuit means having relay means therein adapted to control power to said first relay whereby each circuit means may operate independently of the other.

9. The control system of claim 8 wherein each of said circuit means further includes ignition and fuel-control means in parallel with said fuel feeding means, each of said relay means controlling power to said ignition and fuel-control means, whereby ignition will be continuous when said fuel-feeding means and control means are energized.

10. The control system of claim 8 wherein flame-sensing means is provided in each of said circuits between the other of said lines and said relay means, said flame-sensing means operative to conduct electrical energy to said relay means when the flame sensed is below a safe level.

No references cited.

JAMES W. WESTHAVER, *Primary Examiner.*